(12) United States Patent
Tella et al.

(10) Patent No.: US 8,136,389 B2
(45) Date of Patent: Mar. 20, 2012

(54) PROBE TIP ASSEMBLY FOR SCANNING PROBE MICROSCOPES

(75) Inventors: Richard Paul Tella, Sunnyvale, CA (US); George M. Clifford, Jr., Los Altos Hills, CA (US); Richard R. Workman, Sunnyvale, CA (US); Storrs Townsend Hoen, Brisbane, CA (US); David Patrick Fromm, Palo Alto, CA (US)

(73) Assignee: Agilent Technologies, Inc., Santa Clara, CA (US)

(\*) Notice: Subject to any disclaimer, the term of this patent is extended or adjusted under 35 U.S.C. 154(b) by 653 days.

(21) Appl. No.: 11/930,439

(22) Filed: Oct. 31, 2007

(65) Prior Publication Data

US 2009/0107266 A1    Apr. 30, 2009

(51) Int. Cl.
*H01J 37/00* (2006.01)
(52) U.S. Cl. .......................................................... 73/105
(58) Field of Classification Search ........................ None
See application file for complete search history.

(56) References Cited

U.S. PATENT DOCUMENTS

| 5,557,156 A * | 9/1996 | Elings ...................... 310/316.01 |
| 6,265,718 B1 * | 7/2001 | Park et al. ....................... 250/307 |
| 7,022,976 B1 * | 4/2006 | Santana et al. ................ 250/234 |
| 2002/0014892 A1 * | 2/2002 | Comulada et al. ............ 324/754 |
| 2004/0079673 A1 * | 4/2004 | Nakayama et al. ........... 206/710 |
| 2007/0107502 A1 * | 5/2007 | Degertekin ...................... 73/105 |

\* cited by examiner

*Primary Examiner* — Robert R Raevis

(57) ABSTRACT

A probe assembly for a scanning probe microscope (SPM), a cartridge for a probe assembly for an SPM, and a method of attaching a probe tip to an SPM are described.

18 Claims, 7 Drawing Sheets

PROBE TIP ASSEMBLY FOR SCANNING PROBE MICROSCOPES

BACKGROUND

An scanning probe microscope (SPM) is a comparatively high-resolution type of scanning probe microscope, with demonstrated resolution of fractions of a nanometer, more than 1000 times better than the optical diffraction limit.

Many known SPMs include a microscale cantilever with a sharp tip (probe) at its end that is used to scan the specimen surface. The cantilever is typically silicon or silicon nitride with a tip radius of curvature on the order of nanometers. When the tip is brought into proximity of a sample surface, forces between the tip and the sample lead to a deflection of the cantilever. One or more of a variety of forces are measured via the deflection of the cantilevered probe tip. These include mechanical forces and electrostatic and magnetostatic forces, to name only a few.

Typically, the deflection of the cantilevered probe tip is measured using a laser spot reflected from the top of the cantilever into a position detector. Other methods that are used include optical interferometry and piezoresistive cantilever sensing.

If the tip were scanned at a constant height tip-sample forces will vary with sample topography, which may cause tip or sample damage, or incorrect topography measurements. As such, in many SPMs a feedback mechanism is employed to adjust the cantilever deflection to maintain a constant force between the tip and the sample. For example, a 'tripod' configuration of three piezoelectric crystals may be employed, one for scanning each of the x,y and z directions. This eliminates some of the distortion effects seen with a tube scanner. The resulting map of the area s=f(x,y) represents the topography of the sample.

Regardless of the implementation, after use, the probe tip becomes worn and requires replacement or reconditioning to maintain the accuracy of the SPM. The replacement of the probe tip can be a rather difficult process due to the comparatively small size of the tip and lack of accessibility of the tip in the SPM. Moreover, as noted previously, an optical beam is used to illuminate the probe tip, and the beam is reflected back to a position detector. When a probe tip is replaced in known SPMs, the probe tip is often misaligned relative to the optical beam, necessitating a tedious, labor-intensive procedure to align the tip and beam. The tedium of the alignment process is exacerbated in known SPMs because the process is carried out in-situ. Therefore, significant disadvantages exist in replacing probe tips in many known SPMs.

There is a need, therefore, for a probe tip assembly that overcomes at least the shortcomings of known SPMs discussed above.

SUMMARY

In a representative embodiment, a probe assembly for a scanning probe microscope (SPM) includes a cartridge. The cartridge comprises: an alignment fiducial, which is adapted to engage a respective alignment fiducial of a base; a probe tip extending from a cantilever; a translational actuator operative to move the probe tip in a direction; and a guide member provided with the base and adapted to engage a complementary guide member in the cartridge.

In another representative embodiment, a cartridge for a scanning probe microscope (SPM) includes a probe tip extending from a cantilever. The cartridge also includes a translational actuator that is operative to move the probe tip in a direction. In addition, the cartridge includes an alignment fiducial, which is adapted to kinematically mount the probe tip to the SPM. The cartridge also includes a complementary guide member adapted to receive a guide member on the SPM.

In another representative embodiment, method of replacing a probe tip comprises: grasping a cartridge, which includes the probe tip; engaging a guide member of the cartridge with a complementary guide member of a scanning probe microscope (SPM); and engaging an alignment fiducial on the cartridge with an alignment fiducials of the SPM to kinematically mount the cartridge.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DEFINED TERMINOLOGY

As used herein, the terms 'a' or 'an' mean one or more.

As used herein 'kinematic mounting' means mounting an object relative to another object to produce a reproducible positioning of the objects with respect to each other.

DETAILED DESCRIPTION

In the following detailed description, for purposes of explanation and not limitation, representative embodiments disclosing specific details are set forth in order to provide a thorough understanding of the present teachings. Descriptions of known devices, materials and manufacturing methods may be omitted so as to avoid obscuring the description of the example embodiments. Nonetheless, such devices, materials and methods that are within the purview of one of ordinary skill in the art may be used in accordance with the representative embodiments.

The representative embodiments are described in connection with SPM applications. However, this is merely illustrative and other applications are contemplated. In particular, the present teachings may be applied in situations requiring accurate alignment of a component that is comparatively difficult to align in-situ.

Figure 1:
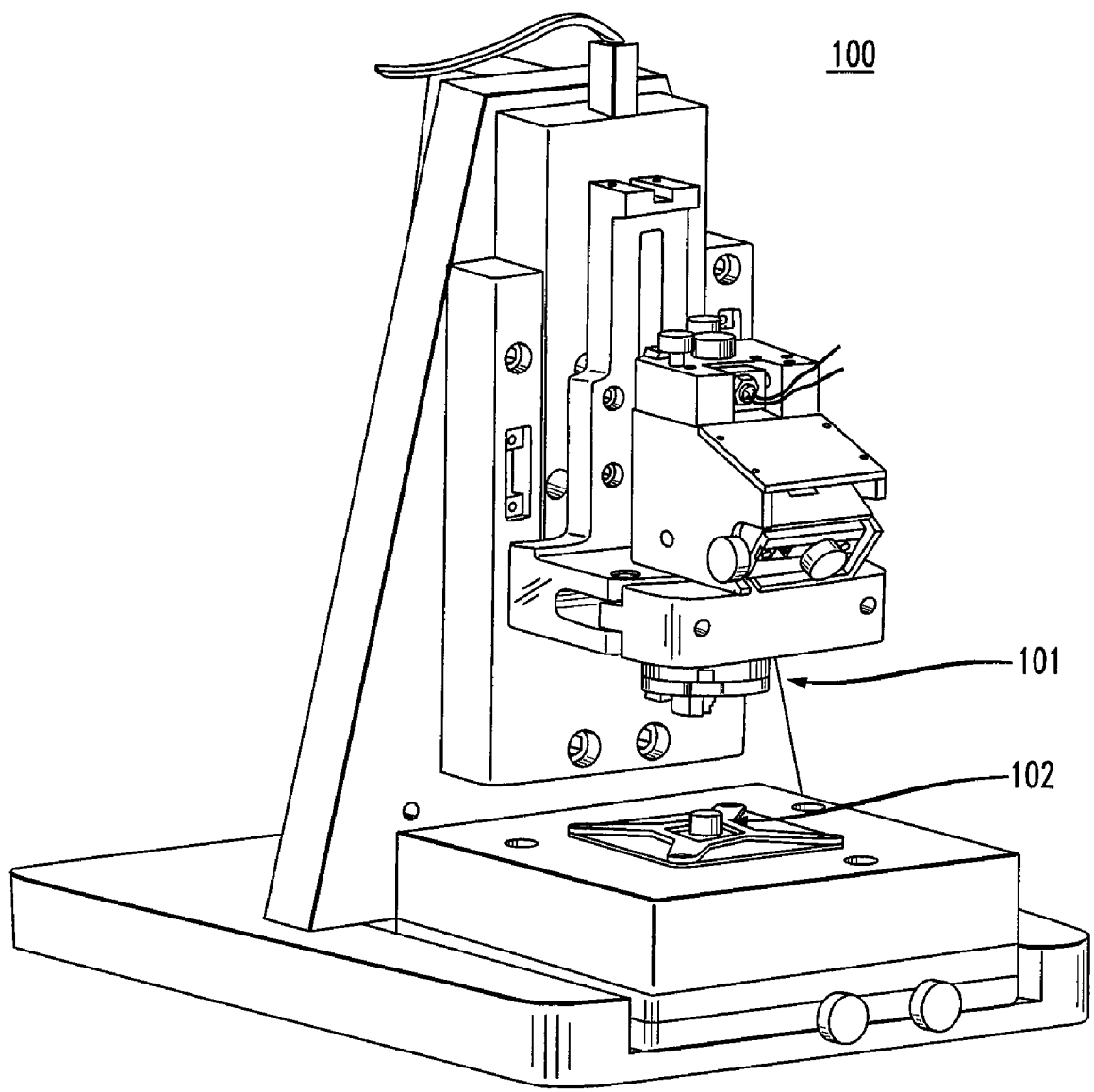
FIG. 1 is a perspective view of an SPM in accordance with a representative embodiment.

FIG. 1 is a perspective view of an SPM 100 in accordance with a representative embodiment. In the representative embodiments, the probe assembly is described generally for use in SPMs. As will be readily appreciated by one of ordinary skill in the art, the present teachings are applicable to various types of SPMs. For example, the present teachings are applicable to atomic force microscopes (AFMs), which may be known to some as scanning force microscopes (SFMs). The SPM 100 comprises many electrical and mechanical components, the discussion of which is outside the scope of the present teachings. The SPM 100 does include a probe assembly 101, components of which are described in connection with representative embodiments herein. A sample 102 is maintained as shown for measurement and testing by the SPM 100.

Figure 2A:
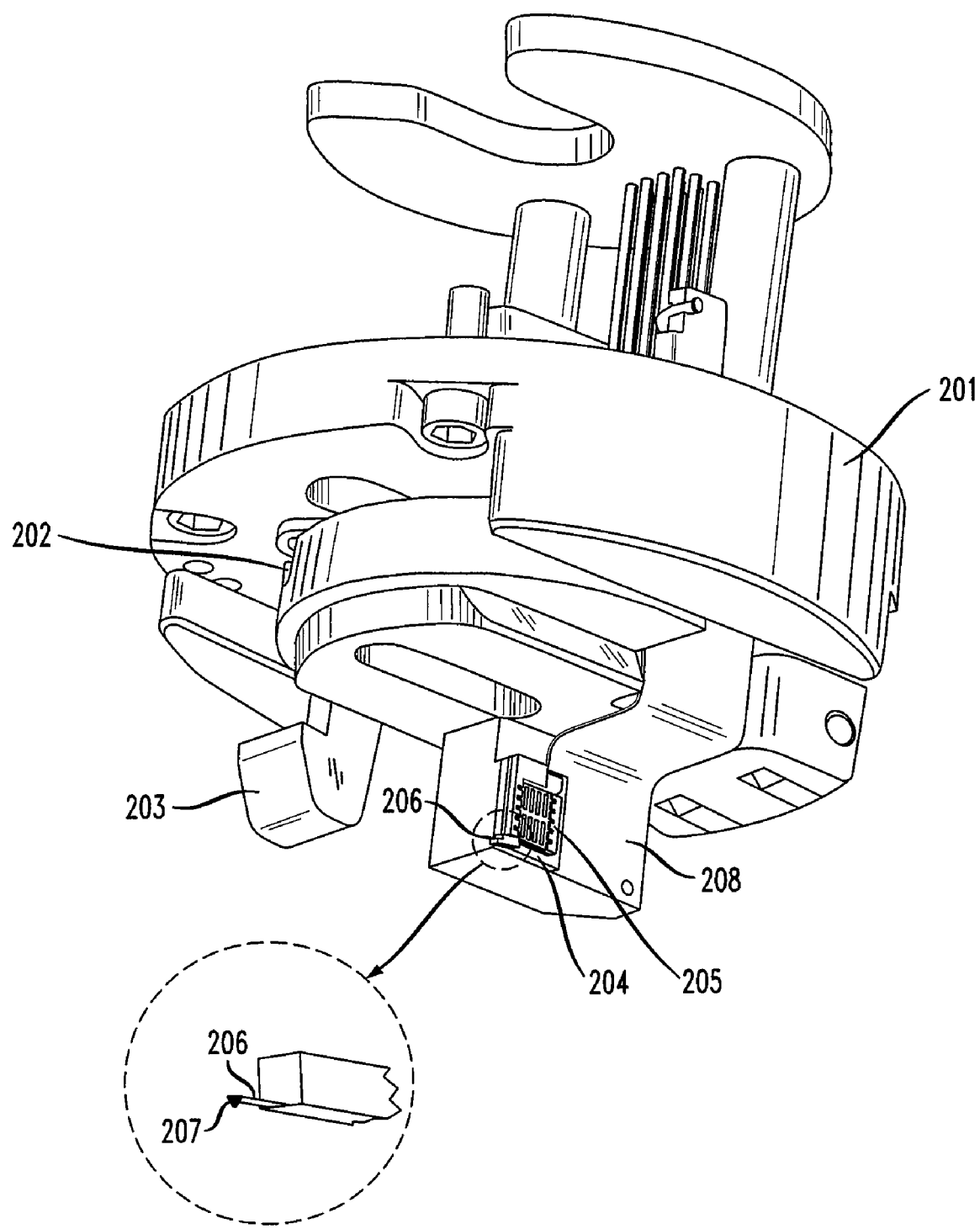
FIG. 2A perspective view of a probe assembly in accordance with a representative embodiment.

FIG. 2A is a perspective view of the probe assembly 101 shown in greater detail. The probe assembly includes a base 201 and a cartridge 202 attached to the base 201. The base 201 is generally affixed to the SPM 100, whereas the cartridge 202 is removably attached to the SPM 100 through its connection to the base 201. As described more fully herein, a latch lock 203 is used to disengage a latching mechanism, which maintains the cartridge in a particular position for scanning probe microscopy.

The cartridge 202 has a substrate 204 that has a translational actuator 205 formed from the substrate 204 or provided over the substrate 204. In either case, the translational actuator 205 is referred to herein as being disposed over the substrate 205. In a representative embodiment, the translational actuator 205 is adapted to raise and lower a cantilever 206, which has a probe tip 207 disposed thereover. Electrical connections for various functions such as power and control of the translational actuator 205 are provided between by a flexible circuit 208 or similar connection. As described herein, the flex circuit 208 is connected to contacts of the SPM.

Figure 2B:
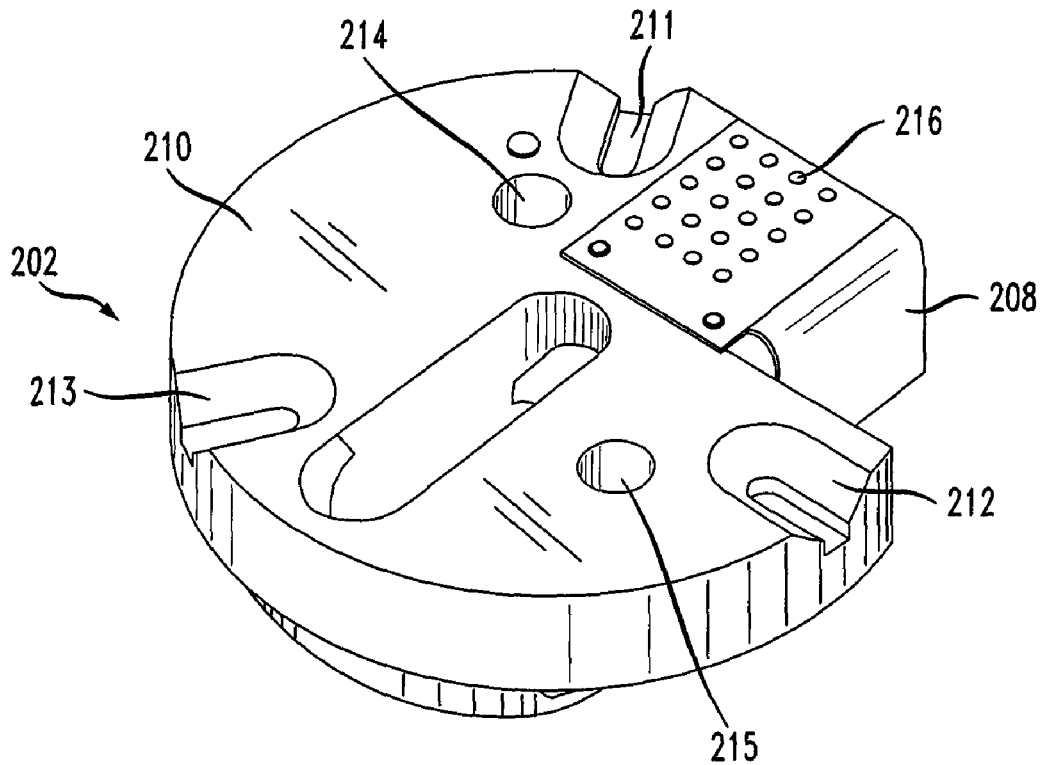
FIG. 2B is a perspective view of a cartridge in accordance with representative embodiment.

FIG. 2B is a perspective view of the cartridge 202 showing a surface 210. The surface 210 includes alignment fiducials 211, 212, 213 arranged at approximately 120° intervals. The fiducials 211, 212, 213 are illustratively recesses or grooves adapted to receive alignment fiducials of the base 201 (not shown in FIG. 2B). As described more fully herein, in cooperation, the alignment fiducials 211-213 and those of the base foster kinematic mounting of the cartridge 202 and the base 201, and thereby the accurate registration of the probe tip 207 (not shown in FIG. 2B) on the probe assembly 101.

In addition to the alignment fiducials 211-213, seating members 214, 215 are provided over the surface 210. The seating members 214, 215 are adapted to engage complementary seating members of the base 201. These seating members usefully provide registration of the cartridge on a plane parallel to the plane of the surface 210 to ensure proper location of the cartridge for kinematic alignment. As described more fully herein, the seating members 214, 215 must be properly engaged with respective complementary seating members of the base before the cartridge can be affixed through actuation of the latching mechanism controlled by the latch lock 203. For example, the seating members may be implemented as holes formed in the surface 210 of the cartridge 202 for receiving the respective complementary seating members.

The flex circuit 208 includes a plurality of contacts 216 disposed over a surface parallel to the surface 210. The contacts 216 are aligned with respective contacts of the SPM during the kinematic mounting process and are engaged through actuation of the latching mechanism. Beneficially, the electrical connections between the cartridge 202 and the SPM 100 are made passively and accurately through the kinematic mounting afforded by representative embodiments.

Figure 2C:
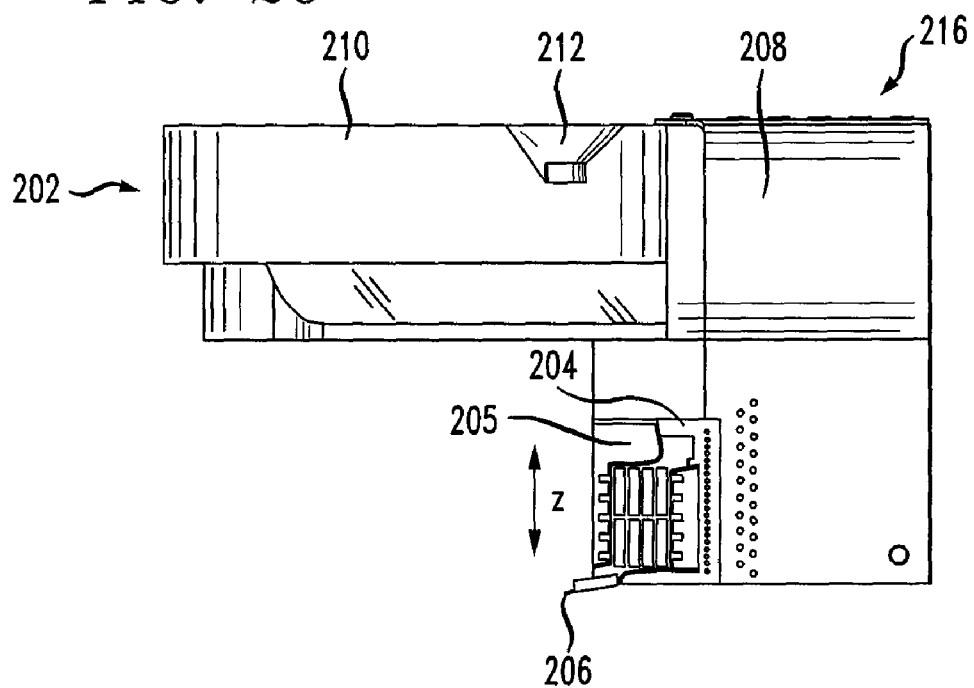
FIG. 2C is a side view of the cartridge of FIG. 2B.

FIG. 2C is a side view of the cartridge 202. FIG. 2C illustrates more clearly the positioning of the translational actuator 205, the cantilever 206 and, thus the probe tip 207. As is known, the probe tip 207 and cantilever 206 may be monolithically formed from a common substrate using known semiconductor processing techniques, and fastened to the translational actuator 205. Alternatively, the translational actuator 205, the cantilever 206 and the probe tip 207 may be monolithically formed from a common substrate. The translational actuator 205 usefully provides motion of the probe tip 207 in the z-direction shown in order to maintain a substantially constant deflection of the cantilever (distance between the probe tip and the sample surface). In a representative embodiment, the translational actuator 205 may be a nanostepper actuator such as described in commonly owned U.S. Pat. No. 5,986,381, dated Nov. 16, 1999, entitled "Electrostatic Actuator with Spatially Alternating Voltage Patterns," to S. Hoen, et al. The disclosure of this patent is specifically incorporated herein by reference.

The motion of the translational actuator 205 may be on the order of approximately ±10.0 μm. Another actuator (not shown) or perturbing device may be provided to induce resonance in the probe tip 207 as desired during measurements. Such actuators are often piezoelectric actuators and are known to those of ordinary skill in the art. Alternatively, this oscillatory function may be provided by introducing a perturbation signal to the translational actuator 205.

Electrical connections between the SPM 100 and the translational actuator 205 may be provided by the flex circuit 208. In addition, control signals from the SPM 100 to the translational actuator 205, the flex circuit 208 may also provide feedback signals to the SPM 100 from a sensor (not shown) adjacent to the translational actuator 205. This sensor monitors the actual movement the translational actuator 205. The feedback provides in a closed-loop control of the translational actuator 205, and thus the probe tip 207. As such, measurement control can be provided real-time providing significant benefits over known open-loop monitoring schemes.

As described, the translational actuator 205 is attached to the cartridge 202. This provides clear benefits in performance and ease of maintenance. The translational actuator 205 functions to move the cantilever 206 and probe tip 207, and may provide the oscillatory function thereof. Beneficially, the translational actuator 205 need not move any additional components other than the cantilever 206 and probe tip 207 allowing the movement thereof and response time to be comparatively quick. By contrast, actuators in known SPMs move the entire probe assembly in order to maintain the deflection of the cantilever. Thus, actuators of substantially the same output force are required to move much a greater mass. As will be appreciated, this results in slower movement and greater response time.

Figure 2D:
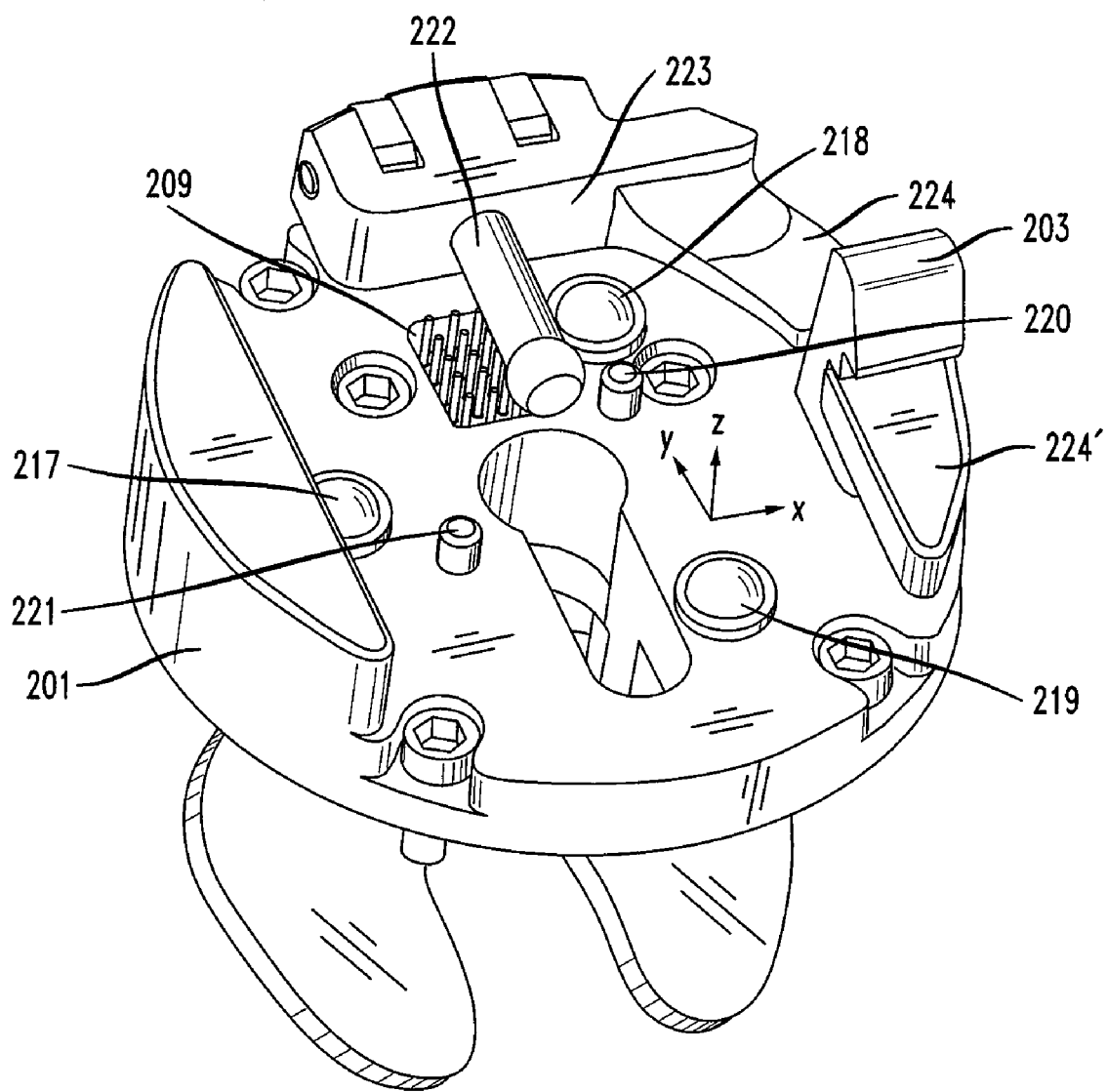
FIG. 2D is a perspective view of a base in accordance with representative embodiment.

FIG. 2D is a perspective view of a base 201 in accordance with representative embodiment, and illustrates details useful in kinematically mounting the cartridge 202 thereto. The base 201 includes alignment fiducials 217, 218 and 219, which are illustratively spheres or similar protrusions. The alignment fiducials 218, 217 and 219 engage, respectively, alignment fiducials 211, 212 and 213; and complementary seating members 220 and 221 engage seating members 214 and 215 on the cartridge 202, respectively.

The base 201 also includes a guide member 222, which in the present illustrative embodiment is substantially cylindrical. As described more fully herein, during kinematic mounting the cartridge 202 is moved manually in the y-direction (of the coordinate system shown) and the guide member 222 engages a complementary guide member (not shown in FIG.

2D) on the cartridge 202. During continued movement in the y-direction, the guide members maintain the cartridge 202 in substantially linear motion until the cartridge abuts an end 223 of the base. At this point, the respective alignment fiducials of the base and the cartridge will have substantially aligned. Moreover, engagement of the seating members 220, 221 with complementary seating members on the cartridge 202. A latching mechanism 224 is depressed at an end 224' in the −z-direction, which drives the guide member 222 in the same direction. The latch lock 203 then can be engaged and the cartridge 202 is kinematically mounted and removably attached to the base 201. As will be appreciated, once kinematically mounted and latched, the cartridge 202 is constrained along six degrees of freedom (i.e., three Cartesian directions and three angular directions.).

The arrangement of the alignment fiducials and seating members of the base 201 and the cartridge 202 with respect to the location of the cantilever 206 and probe tip 207 beneficially provides for temperature-induced expansion and contraction. In particular, after engagement of base 201 and cartridge 202, the probe tip 207 is located in a position substantially directly beneath a center of the three alignment fiducials 211,212,213/218,217,219. Expansion and contraction due to temperature variation is substantially symmetric about this center, and the location of the center thus remains substantially unchanged. As such, the location of the probe tip 207 in the x-y plane is substantially unaffected by the expansion/contraction due to temperature effects.

In representative embodiments described to this point, the base 201 and the cartridge 202 each comprise a plurality of alignment fiducials. In other representative embodiments, the base 201 and the cartridge 202 may each comprise a single alignment fiducial to effect kinematic mounting in at least three degrees of freedom (e.g., six degrees of freedom). For example, the three fiducials 211-213 may be replaced by a single alignment fiducial (recessed or grooved) in the shape of a three bladed propeller; and the complementary alignment fiducial of the base 201 may be a protrusion in the shape of the three bladed propeller, with each 'blade' being at 120°. It is emphasized that this is merely illustrative and other single alignment fiducials are contemplated.

Figure 3A:
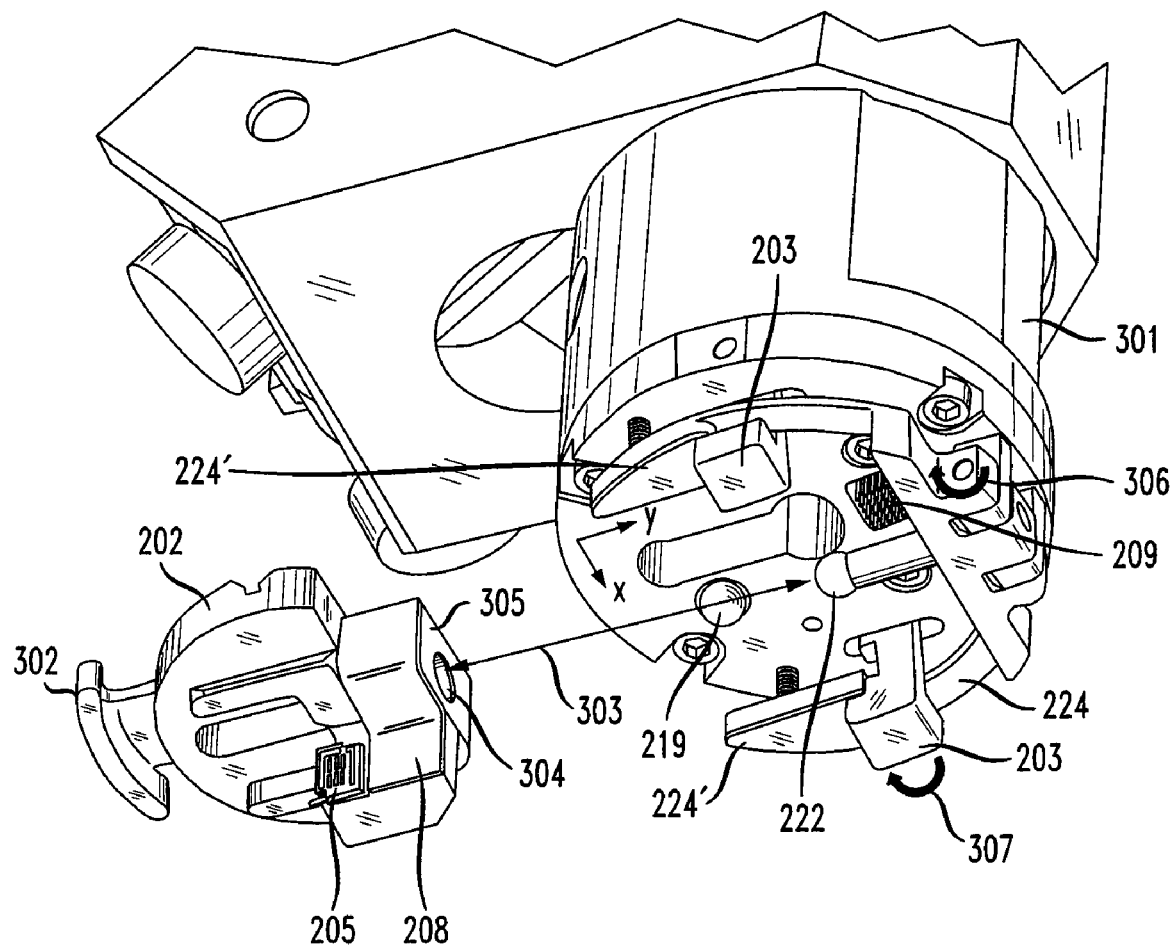
FIG. 3A is a perspective view showing the engagement of the cartridge and the base in accordance with representative embodiment.

FIG. 3A is a perspective view showing the engagement of the cartridge 202 and the base 201 in accordance with representative embodiment. Many of the details of the cartridge 202 and the base 201 described in connection with the representative embodiments of FIGS. 1-2D are common to the presently described embodiments. Such details are not repeated to avoid obscuring the description of the present representative embodiments.

The base 201 is connected to a probe head 301 as shown. The cartridge 202 is held by an optional handle 302 and moved manually along the line 303. The guide member 222 engages a complementary guide member 304 on a rear surface 305 of the cartridge 202 and guides the cartridge 202 along the line 303 (y-direction) until the rear surface 305 abuts the rear surface 223 of the base (not shown in FIG. 3A). For example, the complementary guide member may be implemented as a hole formed in the rear surface 305 for receiving the respective guide member 222. Once the rear surfaces 305, 223 make contact, the alignment fiducials 211-213 and 217-219; and the seating members 214, 215 and 220, 221 are substantially aligned. At this point, the end 224' of the latching mechanism 224 is depressed in the −z direction, which causes a rotation 306 of the latching mechanism 224. In the present embodiment, the latching mechanism 224 extends about the outer portion of the base 201, and includes two ends 224' and two latch locks 203 as shown. The latching mechanism having two ends 224' and extending about the outer portion of the base 201 is merely an alternative to the embodiments described previously.

The guide member 222 is connected to the latching mechanism 224 and through the rotation 306 thereof, the guide member moves in the −z direction. The movement of the guide member 222 forces the cartridge 202 to be moved in close contact with the base. Next, the latch lock 203 is rotated as shown at 307, which locks the latching mechanism 224; and thereby the cartridge 202 is locked in a substantially fixed position.

Notably, the seating members 214, 215 and 220, 221 provide a measure of assurance that the cartridge is in fact kinematically aligned. In particular, if the seating members are not properly engaged, indicating that the cartridge 202 is not properly aligned, the latching mechanism 224 cannot be depressed far enough for the latch lock 203 to be engaged. This provides a clear indication that the cartridge 202, and thereby the cantilever is not aligned properly and thus an indication that remediation is required.

Figure 3B:
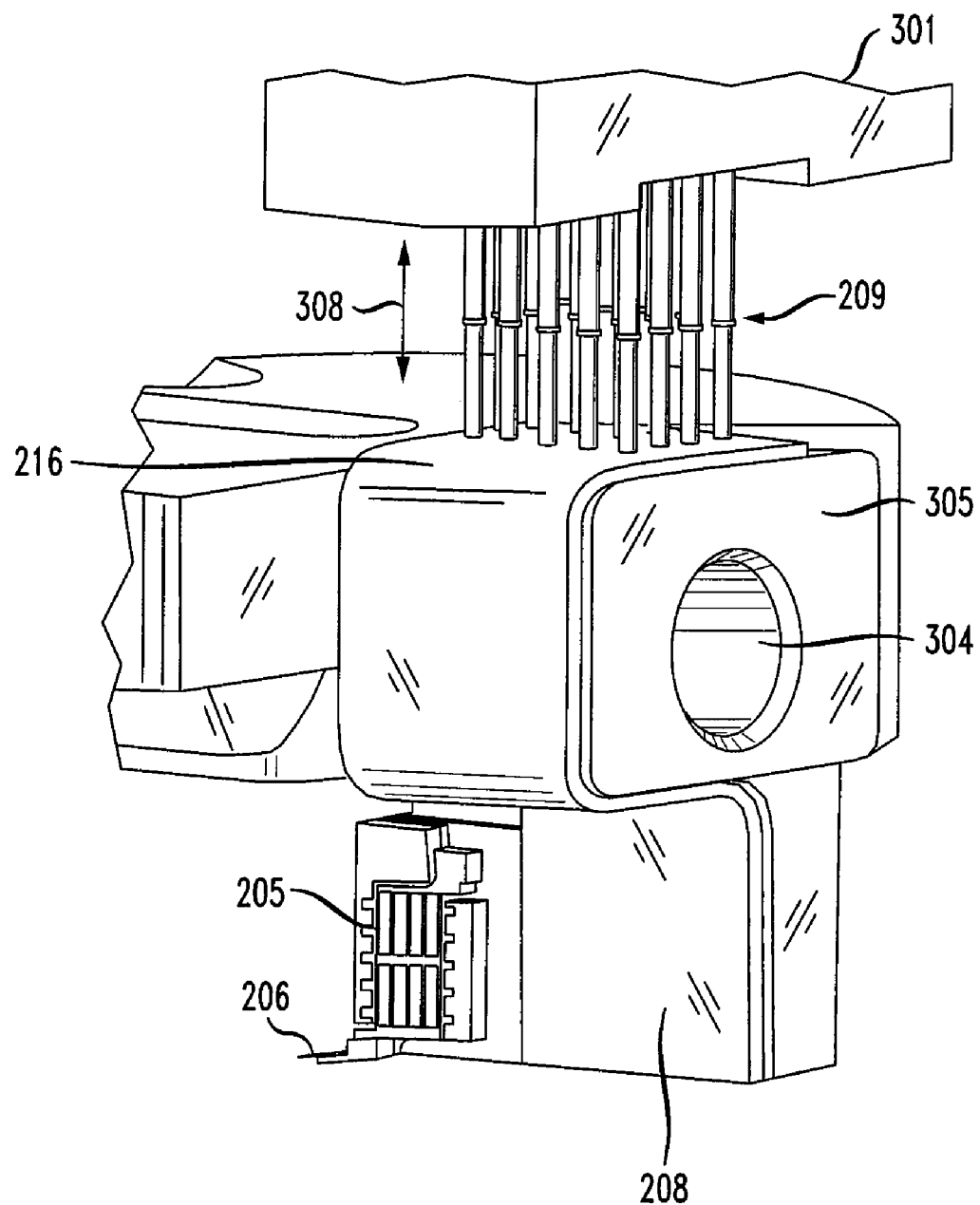
FIG. 3B is a perspective view of the cartridge engaging electrical contacts of the cartridge to electrical contacts of the probe assembly in accordance with a representative embodiment.

Substantially simultaneously with the kinematic mounting, the connections between the contacts 209 of the SPM and the contacts 216 of the flex circuit 208 are made. The details of the connection are shown more closely in FIG. 3B. As will be appreciated, this somewhat automatic electrical connection offers significant improvement in time and labor compared to many known SFMs in which manual connections are required. Moreover, the contacts 209, 216 are maintained at a distance apart by the guide member 222 during most of the kinematic mounting process. At the next step of the process, when the latching member 224 is depressed, the movement of the cartridge 202 in the −z-direction results in the movement of the cartridge along the direction 308 and the engagement of the contact 216 of the flex circuit 208 with the contacts 209. Beneficially, by maintaining the contacts 209, 216 apart during the seating of the cartridge 202, damage to the contacts and the flex circuit is substantially avoided. Moreover, when removing the cartridge for replacement/reconditioning, after disengaging the latch lock 203, the guide member 222 separates the contacts 209, 216 (again in the direction 308) and maintains the separation thereby preventing damage to the contacts.

Figure 4:
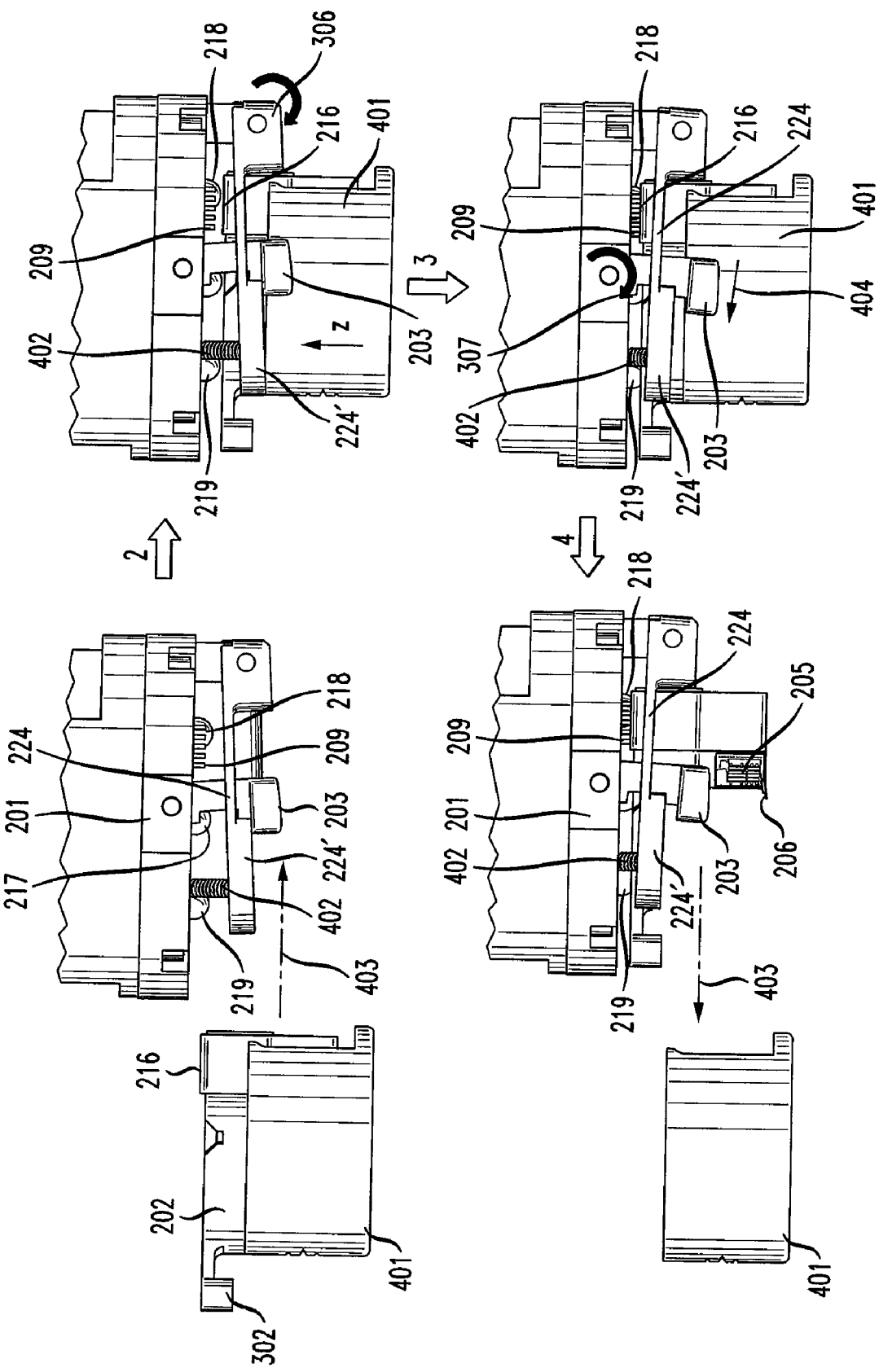
FIG. 4 is a side view showing the engagement sequence of the cartridge and the base in accordance with a representative embodiment.

FIG. 4 is a side view showing the engagement sequence of the cartridge 202 and the base 201 in accordance with a representative embodiment. Many of the details of the cartridge 202 and the base 201 described in connection with the representative embodiments of FIGS. 1-3 are common to the presently described embodiments. Such details are not repeated to avoid obscuring the description of the present representative embodiments.

In the first part of the sequence, the cartridge 202 includes a cover 401 disposed over a significant portion thereof. Most significantly, the cover 401 is disposed over the cantilever 206 and probe tip 207 and offers protection. Notably, in certain representative embodiments, the cantilever 206 and probe tip 207 extend beyond all other components in the probe assembly. Beneficially, this fosters scanning of larger surface sample areas than is realized in many known SPMs, which are constrained to a protective cavity. As such, the sample to be scanned must be small enough to be placed within this cavity. Naturally, having the cantilever 206 and probe tip 207 protruding this renders these components susceptible to damage. The cover 401 provides the needed protection of the cantilever 206 and probe tip 207 during the attachment and removal of the cartridge.

In this first part of the sequence, the cartridge 202 is not in contact with the base 201, which is connected to the probe head 301 as shown. The latching mechanism 224 is in an unlatched state, with a spring member 402 unloaded as shown. The cartridge is manually moved along direction 403, until as shown in step 2, the cartridge 202 initially engages the base 201 through the engaging of the guide member 222 with the complementary guide member 304 as described more fully previously. In the second step ('2') of the sequence, it can be seen that the contact 209 are separated from the contact 216 due to the action of the guide members 222,304. As alluded to previously, this separation prevents damage to the contacts.

Movement along the direction 403 continues until contact between the surfaces 223, 305 of the base 201 and cartridge 202, and the alignment of the alignment fiducials 211-213/217-219 and alignment of seating members 214,215/220,221 occurs. The application of a force in the −z-direction to the latching mechanism 224 causes the pivoting action 306 and the engagement of alignment fiducials 211-213/217-219, and seating members 214,215/220,221 as described previously. Moreover, the applied force causes the engaging of contacts 209 and contact 216 in an aligned manner.

Upon proper engagement, kinematic mounting is realized, and the third step in the sequence (step '3') is carried out and a force 404 is applied to the lock latch 203 by a spring member (not shown) is engaged through the pivot action 306 as shown. At this point, process of affixing a probe tip to an SPM according to a representative embodiment is complete. At the final step in the sequence (step '4'), the cover is removed exposing the cantilever 206 and probe tip 207.

The embodiments described to this point have focused mostly on the attachment/replacement of a probe tip to an SPM. Naturally, the reverse process, the removal of the probe tip from the SPM is effected by reversing the attachment process. Specifically, by carrying out steps 4 through 1 in FIG. 4, the cartridge 202 may be detached from the base 201; and another cartridge with a new or reconditioned probe tip can be attached by carrying out steps 1 through 4.

As alluded to previously, replacing probe tips in-situ is a labor-intensive procedure, requiring manipulation of a very small component, the probe tip, in a confined area of the SPM. According to the present teaching, the comparatively large cartridge 202 is handled manually or possibly robotically or by similar automated devices. As such, removal of the worn probe tip is facilitated significantly compared to known methods.

After a cartridge is removed, a new tip may be attached to the cartridge, thereby reconditioning the used cartridge. By contrast to many known tip replacement methods, the attachment of the new probe tip is rather straight-forward, being carried out on a workbench where access to the probe tip is facilitated.

Moreover, initial alignment of the probe tip is substantially passive. In particular, the location of the alignment fiducials 211-213 and seating members 214,215 are fixed with precision. The precision may be afforded through a precise (e.g., injection) molding process, if the cartridge 202 is made of a plastic material. Alternatively, other known manufacturing processes, which are material-dependent, may be used to set the location of the fiducials and seating members with the needed precision. The placement of the alignment features with precision, along with the precise dimensioning of the cartridge 202 in general renders the location of the cantilever 206 and the probe tip 207 comparatively precise.

In view of this disclosure it is noted that the various probe assemblies, cartridges and methods of attaching a probe tip to an SPM can be implemented in variant structures in keeping with the present teachings. Further, the various components, materials, structures and parameters are included by way of illustration and example only and not in any limiting sense. In view of this disclosure, those skilled in the art can implement the present teachings in determining their own applications and needed components, materials, structures and equipment to implement these applications, while remaining within the scope of the appended claims.

The invention claimed is:

1. A probe assembly for a scanning probe microscope (SPM), comprising:
   a cartridge configured to mount to a base, the cartridge comprising:
      an alignment fiducial adapted to engage a respective alignment fiducial of the base;
      a probe tip extending from a cantilever; and
      a translational actuator operative to move the probe tip in a direction;
   the cartridge defining a complementary guide member hole adapted to engage a guide member protruding from the base, a first seating member hole adapted to engage a first complementary seating member protruding from the base, and a second seating member hole adapted to engage a second complementary seating member protruding from the base, when the cartridge is properly located for kinematic mounting to the base.

2. A probe assembly as claimed in claim 1, wherein the alignment fiducial engages the respective alignment fiducial to kinematically mount the cartridge to the base.

3. A probe assembly as claimed in claim 2, wherein the translational actuator maintains the cantilever at a substantially fixed deflection during motion over a surface.

4. A probe assembly as claimed in claim 1, wherein the translational actuator is a nanostepper actuator.

5. A probe assembly as claimed in claim 1, wherein the guide member is coupled to a latching mechanism operative to lock the cartridge in a substantially fixed position.

6. A probe assembly as claimed in claim 1, wherein the cartridge further comprises an electrical contact adapted to engage a respective electrical contact of the probe assembly.

7. A probe assembly as claimed in claim 1, wherein the alignment fiducial of the cartridge and the respective alignment fiducial of the base provide alignment along at least three degrees of freedom.

8. A probe assembly as claimed in claim 1, wherein the alignment fiducial of the cartridge comprises a cavity formed in the cartridge and the respective alignment fiducial of the base comprises a protrusion.

9. A cartridge configured for mounting to a base of a probe assembly for a scanning probe microscope (SPM), the cartridge comprising:
   a probe tip extending from a cantilever;
   a translational actuator operative to move the probe tip in a direction; and
   an alignment fiducial adapted to kinematically mount the probe tip to the base of the SPM;
   the cartridge defining a complementary guide member hole adapted to receive a guide member on the base of the SPM, a first seating member hole operative to engage a first complementary seating member on the base, and a second seating member hole operative to engage a second complementary seating member on the base, when the cartridge is properly located for kinematic mounting.

10. A cartridge as claimed in claim 9, further comprising a cover adapted to be removably attached to the cartridge.

11. A cartridge as claimed in claim 9, wherein the translational actuator maintains the cantilever at a substantially fixed deflection during motion over a surface.

12. A cartridge as claimed in claim 9, further comprising an oscillatory actuator.

13. A cartridge as claimed in claim 9, further comprising an electrical contact adapted to engage an electrical contact on the SPM upon the kinematic mounting.

14. A cartridge as claimed in claim 9, wherein the translational actuator is a nanostepper actuator.

15. A cartridge as claimed in claim 9, wherein the cartridge further comprises an electrical contact adapted to engage a respective electrical contact of the SPM substantially simultaneously with the kinematic mounting.

16. A probe assembly for a scanning probe microscope (SPM), comprising:
    a base affixed to the SPM, the base comprising a protruding guide member and at least one alignment fiducial; and
    a cartridge configured to removably mount to the base and defining a complementary guide member hole adapted to engage the protruding guide member of the base, the cartridge comprising:
    a probe tip extending from a cantilever;
    a translational actuator operative to move the probe tip in a direction; and
    at least one alignment fiducial corresponding to the at least one alignment fiducial of the base for kinematic mounting of the cartridge to the base,
    wherein the base and the cartridge have complementary engagement means for providing registration of the cartridge on a plane parallel to a surface of the cartridge to ensure proper location of the cartridge for kinematic alignment.

17. A probe assembly as claimed in claim 16, wherein the base further comprises:
    a latching mechanism coupled to the protruding guide member for locking the cartridge in a substantially fixed position.

18. A probe assembly as claimed in claim 16, wherein the complementary engagement means comprise a first seating member protruding from the base and configured for insertion in a corresponding first seating member hole formed in the surface of the cartridge, and a second seating member protruding from the base and configured for insertion in a corresponding second seating member hole formed in the surface of the cartridge.

* * * * *

UNITED STATES PATENT AND TRADEMARK OFFICE
CERTIFICATE OF CORRECTION

PATENT NO. : 8,136,389 B2  Page 1 of 1
APPLICATION NO. : 11/930439
DATED : March 20, 2012
INVENTOR(S) : Richard Paul Tella et al.

It is certified that error appears in the above-identified patent and that said Letters Patent is hereby corrected as shown below:

On the Title page, in field (75), in "Inventors", in column 1, line 3, delete "R." and insert -- K. --, therefor.

Signed and Sealed this
Twenty-second Day of May, 2012

David J. Kappos
*Director of the United States Patent and Trademark Office*